United States Patent [19]

Kogane et al.

[11] 4,447,146
[45] May 8, 1984

[54] PHOTOGRAPHIC PRINTING APPARATUS

[75] Inventors: Mikio Kogane; Seiichi Yamazaki, both c/o Fuji Photo Film Co., Ltd., No. 210, Nakanuma, Minami-ashigara-shi, Kanagawa, Japan

[73] Assignees: Mikio Kogane; Seiichi Yamazaki, both of Kanagawa, Japan

[21] Appl. No.: 363,733

[22] Filed: Mar. 30, 1982

[30] Foreign Application Priority Data

Apr. 1, 1981 [JP] Japan ............................. 56-47147[U]
Apr. 11, 1981 [JP] Japan ............................. 56-49197[U]
Apr. 6, 1981 [JP] Japan ................................. 56-48479

[51] Int. Cl.$^3$ ............................................. G03B 29/00
[52] U.S. Cl. ...................................... 355/28; 101/408; 134/64 P; 134/122 P; 271/204; 354/346; 355/100; 355/106
[58] Field of Search ...................... 355/28, 100, 106; 354/312, 319, 321, 345, 346, 340; 271/268, 277, 204; 101/408; 134/64 P, 122 P

[56] References Cited

U.S. PATENT DOCUMENTS 3,809,390 5/1974 Lenoir ................................. 271/204
4,012,753 3/1977 Schmidt ......................... 354/346 X
4,136,946 1/1979 Nishimoto ............................ 355/28

Primary Examiner—Richard A. Wintercorn
Attorney, Agent, or Firm—Sughrue, Mion, Zinn, Macpeak & Seas

[57] ABSTRACT

A printing apparatus includes a paper cutter, a hole puncher and a guide clip which engages a strip of printed paper for conveyance to a developer. As the printer operates intermittently while the developer operates continuously, a reservoir or buffer zone is provided for the paper between the two. A mechanism for storing guide clips automatically delivers and orients a guide clip so as to engage a transported paper strip for further conveyance therewith by means of a chain conveyor or the like. As the printer may move vertically independently of the fixed developer, the conveyor is made expandible so as to accommodate differences in the conveyance distance.

19 Claims, 11 Drawing Figures

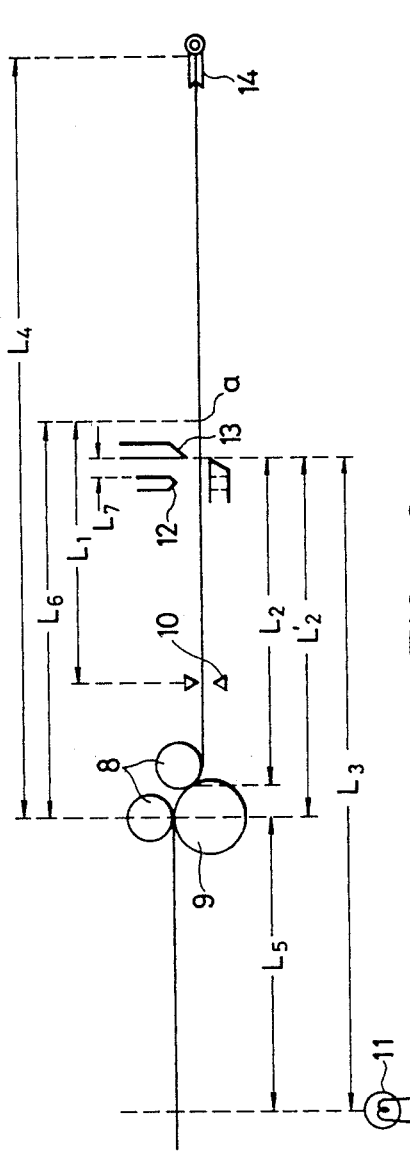
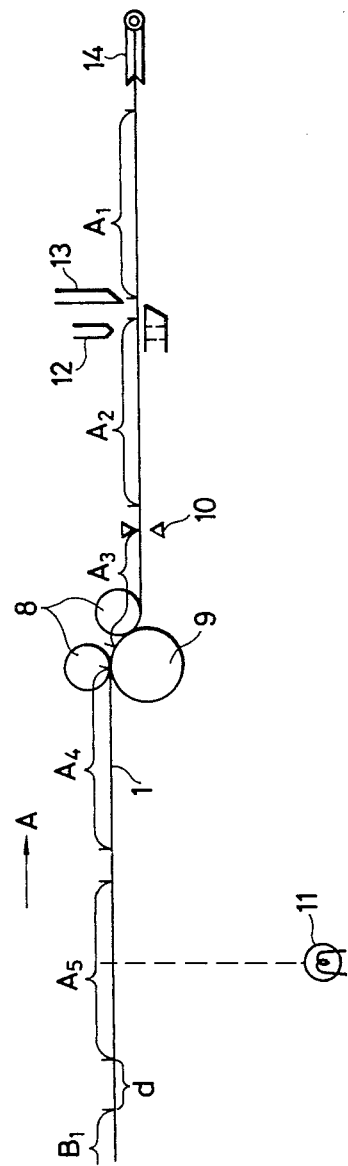

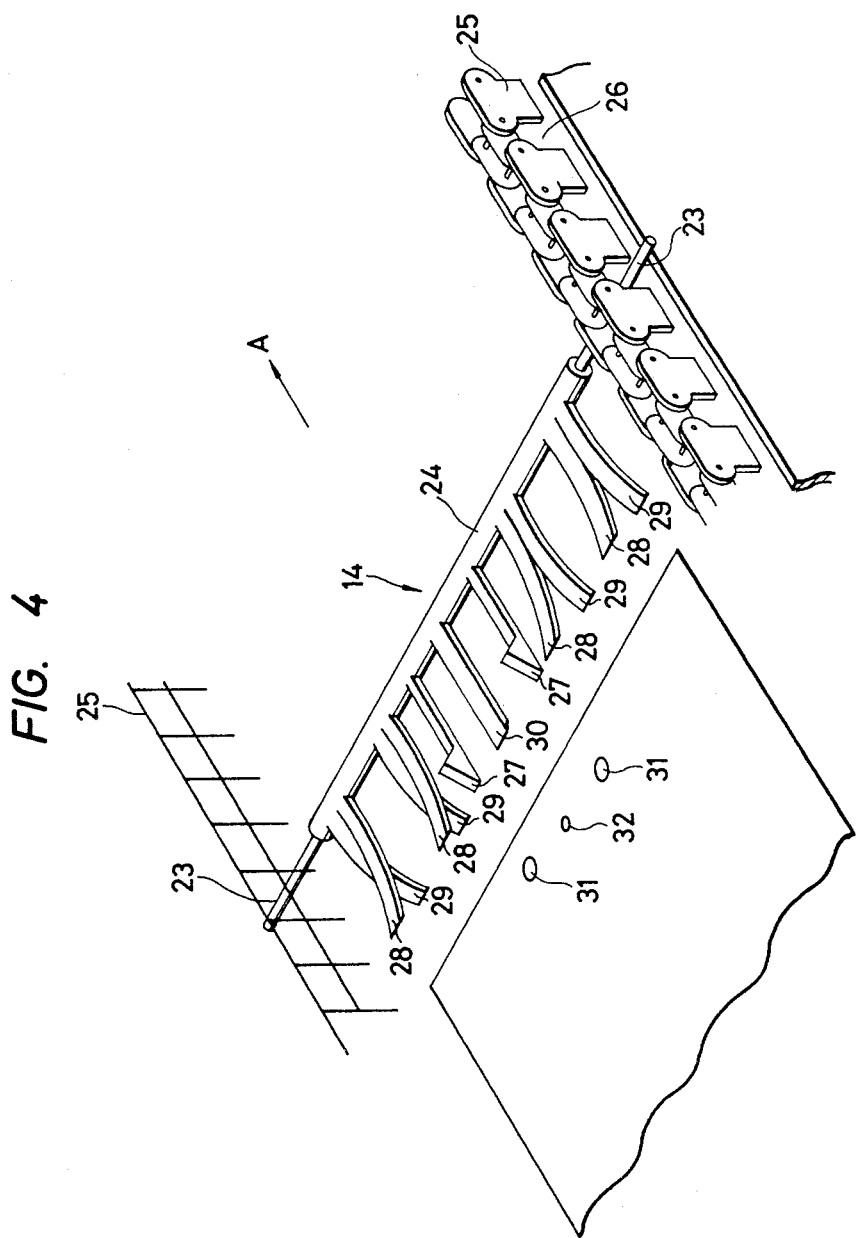

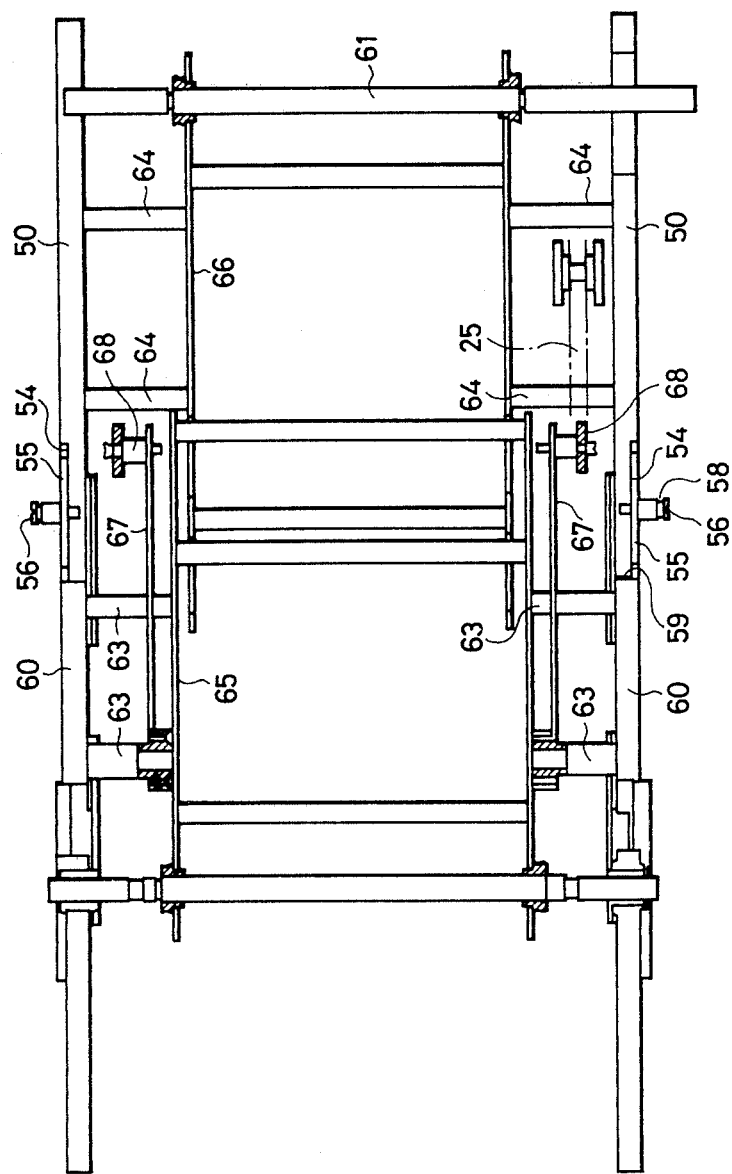

PHOTOGRAPHIC PRINTING APPARATUS

BACKGROUND OF THE INVENTION

This invention relates to a photographic printing apparatus wherein images are printed from a negative onto a strip of photographic printing paper and the strip is then transferred to a developing apparatus.

Various methods are known for harmonizing the speed of intermittent printing with that of continuous development in order to feed a developing apparatus with a strip of photographic printing paper after it has been printed. These methods may be roughly classified into methods in which a strip of printed paper is cut into sheets, each defining an independent frame, and is transferred to the developing apparatus, and methods in which a strip of printed paper is fed directly to the developing apparatus. The former method, however, requires a complicated mechanism including many rollers for transporting sheets of printing paper into the developing apparatus, since the printing paper is less rigid than the negative, though it can satisfactorily harmonize the speeds of printing and developing. According to the latter method, it is sufficient to use a simpler mechanism, which may be a leader or a chain-driven clip engaged with the leading edge of the strip, but there remain difficulties in harmonizing the printing and developing speeds. It is sometimes necessary to cut the printed portion of the strip from the unprinted portion.

While the developing device is usually stationary, the printing device is sometimes vertically movable for varying the distance between the light source and the developing table. The vertical movement of the printing device naturally causes a change in the distance between the printing and developing devices. There has, therefore, been a need for a mechanism enabling expansion and contraction of the chain conveyors in accordance with the varying distance between the printing and developing devices.

There is known a rod-shaped guide clip to which the leading edge of a strip of printed photographic paper is connected, and which is engaged at both ends with chain conveyors, or like means moving through a developing tank in which the photographic paper is printed.

A guide clip is set in a predetermined standby position, and a strip of photographic paper is conveyed. When the leading edge of the strip has reached the aforesaid predetermined position, the strip is connected with the guide clip. The presence of various machine parts in the vicinity of the guide clip standby position, however, makes it very difficult to set the guide clip in position manually. After the strip has been conveyed by the guide clip, it is necessary to set another guide clip in a standby position to receive any convey another strip of paper into the developing tank. It has, therefore, been desired to develop a mechanism for automatically guiding a guide clip to a standby position whenever required.

SUMMARY OF THE INVENTION

This invention is based upon the latter method, and relates more particularly to a system in which a guide clip is engaged with the leading edge of a strip of printed photographic paper, and is driven by chains or the like for transfer into a developing apparatus. It is an object of this invention to provide a photographic printing apparatus which can continuously feed a developing apparatus with a printed portion of a strip of photographic printing paper, whether the printing operation continues or has been interrupted.

According to this invention, the aforesaid object is attained by a photographic printing apparatus comprising a cutter for cutting a strip of photographic printing paper, a hole puncher for making perforations in the strip adjacent to the leading edge thereof, means for engaging a printing paper guide clip in the perforations, a reservoir for temporarily accommodating the strip continuing from the guide clip, and guide means for transferring to a developing apparatus, the guide clip with the leading edge of the strip engaged therewith. The clip engaging means is provided as an automatic mechanism wherein a plurality of guide clips for a strip of photograhic paper stay in mutually stacked relation in a clip case aligned with vertical portions of guide grooves. Each guide clip has a rod portion received at both ends in the vertical portions of the guide grooves, and the lowermost guide clip rests in a horizontal portion thereof. First supporting means are provided adjacent to the horizontal portions of the guide grooves for supporting the lowermost guide clip at the engaging portion thereof. Second supporting means are provided above the first supporting means for supporting the engaging portion of another guide clip lying immediately above the lowermost guide clip. A means for pushing the rod portion of the lowermost guide clip is provided on the opposite side of the lowermost guide clip from the first supporting means. The pusher horizontally moves the lowermost guide clip in the horizontal portions of the guide grooves. As soon as the rod portion of the lowermost guide clip reaches a prescribed position, the lowermost guide clip drops along vertical portions of the guide grooves and is set in a standby position for engagement with a strip of photographic paper. With the retraction of the pusher, another guide clip previously lying immediately above the lowermost guide clip is brought down to the horizontal portion of the guide grooves, and its engaging portion is disengaged from the second supporting means, and supported on the first supporting means. When the lowermost guide clip is moved from the horizontal portion of the guide grooves to the lower vertical portions, its engaging portion is rotated about the first supporting means. This rotation takes place without being hindered by upper guide clips, since they are supported on the second supporting means.

In order to satisfy the need in the art for an expansible conveying apparatus, there is provided a mechanism allowing for the expansion and contraction of chains, belts or like circulating conveying means connecting a movable printing device and a stationary developing device, while conveying a strip of photographic paper from the printing device to the developing device.

The strip conveying mechanism of the invention includes a pair of oppositely disposed chains, belts, or like circulating conveying means. Each chain or belt extends about a sprocket provided on the printing device, and a sprocket on the developing device. Each chain or belt is endless, and has an overall length which can fully compensate for any variation in the distance by which photographic paper is conveyed from the printing device to the developing device. The sag or tension of each chain or belt resulting from any such distance variation is absorbed or adjusted by a tension control roller. Two protection plates are provided outwardly of each chain or belt. One of them is supported rotatably on the printing device, while the other is supported rotatably on the developing device, so that they can follow any chain or belt inclination resulting from the vertical movement of the printing device. Each of these protection plates has an inner surface formed with a guide groove which extends parallel to the chain or belt, in which the ends of the guide clip engaged with a chain or belt grooves are slidably supported. A slide plate is provided between the two guide plates. When the aforesaid distance has increased as a result of the vertical movement of the printing device, the slide plate, which is downwardly urged by a spring, moves down to fill the space between the two protection plates, and prevents disengagement of the ends of the guide clip from the chain or belt.

BRIEF DESCRIPTION OF THE DRAWINGS

The invention will now be described by way of example with reference to the drawings; in which:

FIG. 2 is a diagrammatic view illustrating the distance relationships among various parts of the printing and cutting station;

FIG. 3 is a diagrammatic view illustrating the feed of a strip of photographic paper in relation to the printing and cutting operations;

FIG. 4 is a perspective view of a guide clip for photographic paper;

DETAILED DESCRIPTION OF THE PREFERRRED EMBODIMENTS

Figure 1:
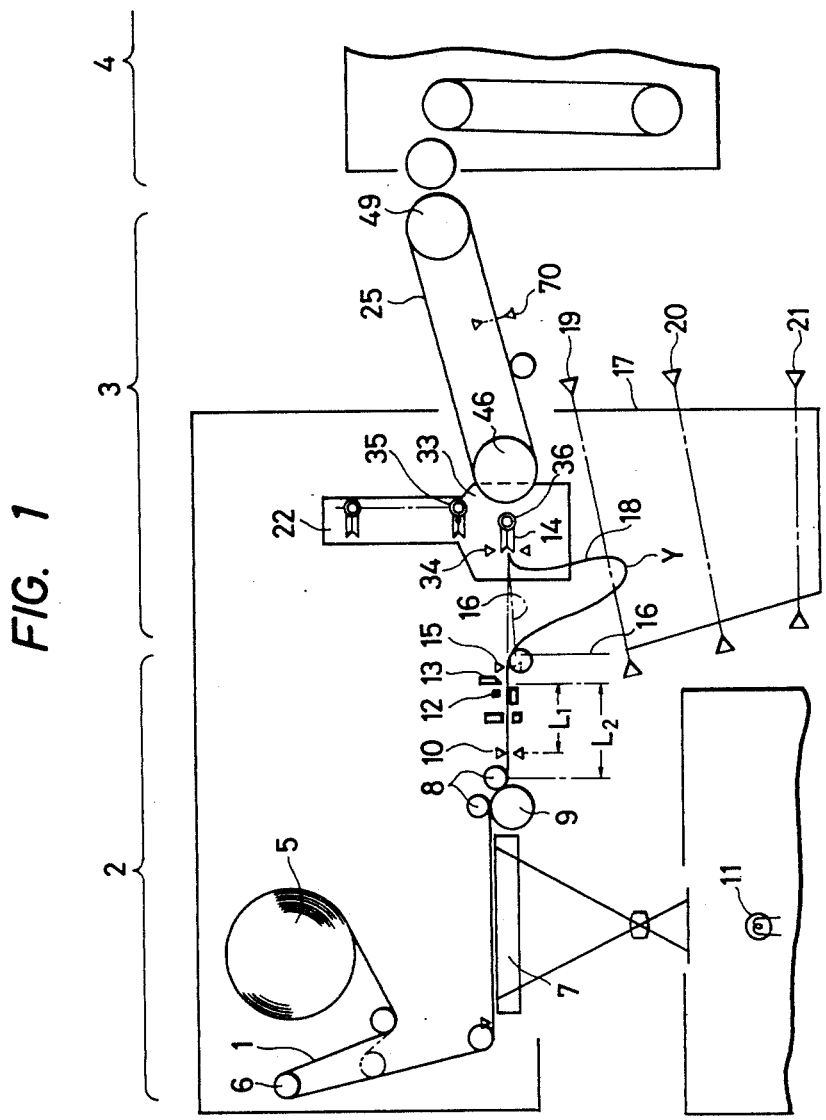
FIG. 1 is a diagrammatic view of the photographic printing apparatus embodying this invention.

A strip of photographic printing paper 1 is conveyed in a light-free enclosure through a printing station 2, a guide station 3 and a developing station 4. The strip 1 is unwound from a spool 5, passed about a tension roller 6 and over a printing table 7, and received between a double press roller 8 and a feed roller 9. A sensor 10 is provided downstream of the press roller 8 for detecting the leading edge of the strip 1. Thus, the strip 1 is readied for a printing operation. The sensor 10 may, for example, be a photoelectric sensor defining a photoelectric detecting slit having a width of about 0.6 to 1.0 mm in the path of strip conveyance. A source of light 11 is provided in alignment with the printing table 7.

A hole puncher 12 and a cutter 13 are provided downstream of the sensor 10 at a certain distance $L_1$ therefrom. The hole puncher 12 is provided for forming the leading edge of the strip 1 with perforations with which a photographic printing paper guide clip 14 may be engaged for conveying the printing paper. A cutter 13 is provided for cutting the leading edge of the strip 1 at a predetermined distance from the perforations.

FIG. 2 is a diagrammatic view showing distance relationships among various parts of the printing and cutting station 2. In FIG. 2, the distance between the sensor 10 and the cutting edge of the cutter 13 is designated at $L_1$, the distance between the cutter 13 and the line of contact between the downstream press roller 8 and the feed roller 9 at $L_2$, the distance between the cutter 13 and the line of contact between the upstream press roller 8 and the feed roller 9 at $L_2'$, the distance between the optical axis of the light source 11 and the cutter 13 at $L_3$, the distance between the axis of the feed roller 9 and the printing paper guide clip 14 at $L_4$, the distance between the axis of the light source 11 and the axis of the feed roller 9 at $L_5$, the distance between the axis of the feed roller 9 and the stop position of the leading edge of the strip 1 at $L_6$, and the distance between the downstream side of the hole puncher 12 and the cutter 13 at $L_7$.

According to this invention a photographic paper return device is provided for enabling the printing of that part of the strip 1 lying in the area defined by the distance $L_2$ or $L_2'$ between the feed roller 9 and the cutter 13. The returning means may comprise a mechanism connected directly to the feed roller 9 for rotating the same in the opposite direction to return the cut edge of the strip 1 to the press roller 8. The sag of the strip 1 which occurs when it is returned is absorbed by the movement of a tension roller 6. The returning means may also comprise a mechanism for imparting reverse rotation to the spool 5, which may be provided either on the spool 5 per se, or connected directly to the spool, for returning the paper from the area $L_2$ or $L_2'$. The latter mentioned mechanism is useful in the event that the sag of the paper is not fully absorbed by the tension roller 6. A combination of the former and latter mechanisms may also be useful. The returning means is very advantageous, since it prevents waste of the strip 1, and ensures economical printing.

The cutter 13 is employed when the spool 5 still carries unprinted paper 1 upon completion of a printing cycle. It cuts the printed portion from the unprinted portion, so that only the printed portion is conveyed to the developing station 4. The leading part of the unprinted portion lying in the area between the press rollers 8 and the cutter 13 is returned by the returning means toward the printing station. The backward movement of the strip 1 is stopped when its leading edge has reached a position between one of the press rollers 8 and the feed roller 9. Thus, the leading part of the unprinted portion of the strip 1 can be partly utilized for printing purposes without being wasted.

A sensor 15 is provided on the exit side of the cutter 13 for detecting a hole formed on a line joining the pair of perforations made by the hole puncher 12 in the strip 1 adjacent to the leading edge thereof, and with which the printing paper guide clip 14 is engaged. The hole is made by the hole puncher 12 simultaneously with the perforations. A clip guide 16 is rotatably provided downstream of the sensor 15. The clip guide 16 is normally in its closed position as shown by a broken line, defining a plane of travel for the strip 1, but when the leading edge of the strip 1 has been engaged by the guide clip 14, the clip guide 16 is rotated to its open position as shown by a solid line, whereby a loop 18 of printed photographic paper, which has been conveyed by the feed roller 9, is formed in a reservoir 17 provided below the clip guide 16. Sensors 19, 20 and 21 are provided in the reservoir 17 for detecting the amount of the loop formed therein.

A plurality of guide clips 14 are slidingly supported by a clip case 22. The lowermost guide clip is separated from the remaining clips to be introduced into the conveyance path of the paper.

FIG. 4 is a perspective view of the photographic paper guide clip 14 and the chains 25 according to this invention.

The photographic paper guide clip 14 comprises a rigid rod portion 23, and an engaging portion 24 formed from an elastic material, such as a resin, integral with the rod portion 23. Each end of the rod portion 23 is received in a groove 26 of one of the chains 25. The grooves 26 of both the chains 25 are aligned with each other relative to the conveyance direction indicated by the arrow A; and therefore, the photographic paper guide clip 14 is positioned at right angles to the conveyance direction. The grooves 26 of the chains 25 are detected by a photoelectric sensor (not shown), and the clip 14 is engaged with the chains by a solenoid, or the like. The engaging portion 24 is provided with engaging pawls 27, upwardly curved projections 28, downwardly curved projections 29 and a central engaging projection 30, all of which extend in a direction opposite the conveyance direction A. The leading edge of the strip of photographic paper 1 is inserted between the upwardly and downwardly curved projections 28 and 29, and the engaging pawls 27 engage the perforations 31 formed in the leading edge of the photographic paper, whereby the strip of photographic paper 1 is engaged by the photographic paper guide clip 14.

A guide clip guide 33 (FIG. 1) is connected to the clip case 22 for guiding the lowermost of the guide clip 14 in the clip case 22 to a station where it is engageable with the strip 1. The guide 33 is provided with a sensor 34 for detecting the hole 32 in the leading edge of the strip 1. This detection takes place when the engaging pawls 27 of the guide clip 14 have been engaged with the perforations 31. A signal is transmitted to indicate that the pawls have been firmly engaged. A sensor 35 is provided at the bottom of the clip case 22 for detecting the presence of a clip or clips 14 therein. A sensor 36 is provided across the path of strip conveyance for checking if the clip 14 is in the correct standby position.

Figure 5:
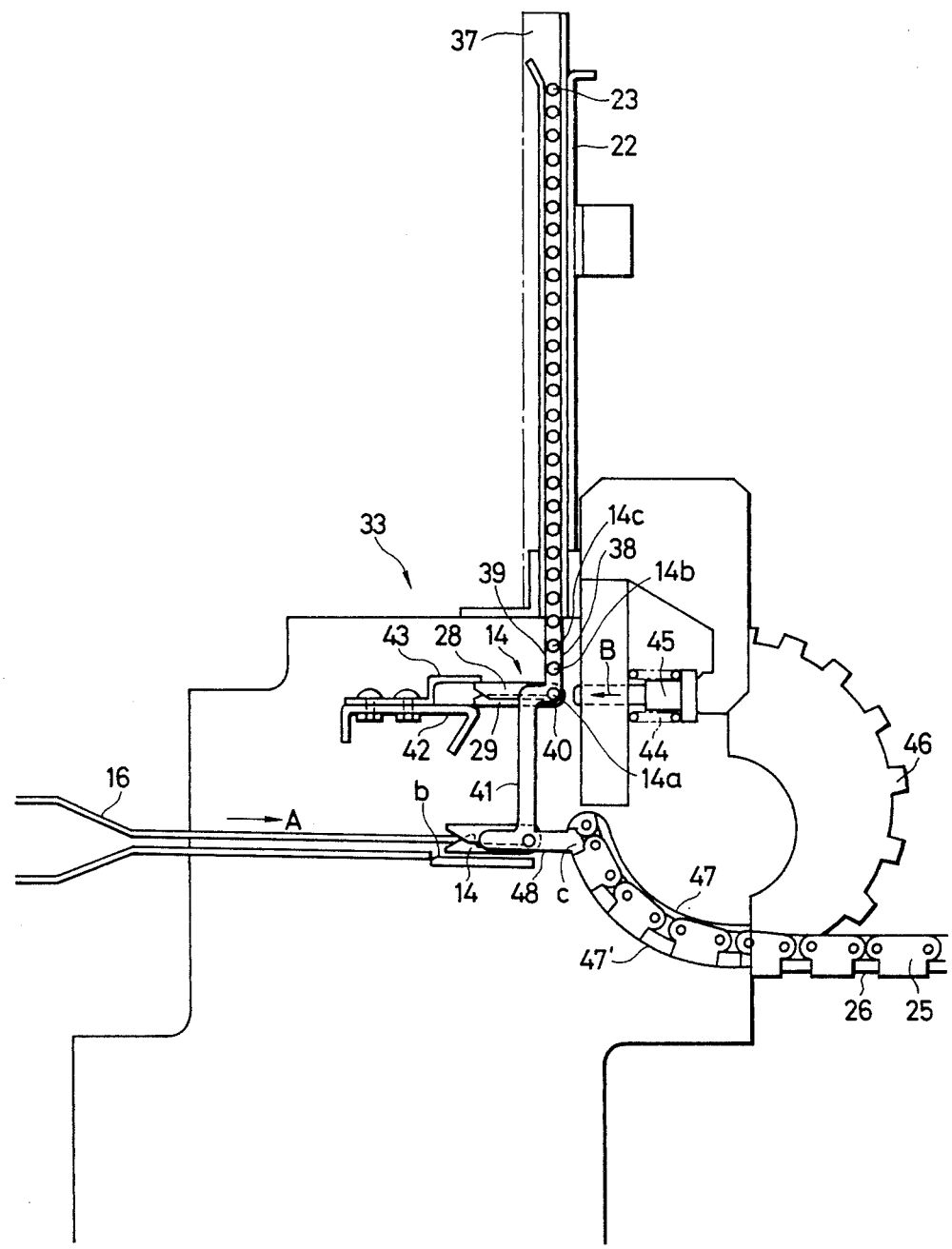
FIG. 5 is a side elevational view of the clip guide.

FIG. 5 is a side elevational view of the clip guide 33.

The clip case 22 is connected to the top of the clip guide 33. The clip guide 33 guides the rod portion 23 of each guide clip 14 at both ends thereof. A clip cartridge 37 in which a plurality of guide clips 14 are mounted is placed in the clip case 22. The clip case 22 has a guide surface connected to a guide groove 38 in the clip guide 33. The guide groove 38 has a substantially vertical portion 39, a substantially horizontal bend 40, and another substantially vertical portion 41. A clip supporting member 42 is provided opposite to the bend 40 for supporting the lowermost clip 14a at the downwardly curved projections 29 at both ends thereof, thereby supporting all the other clips 14b, 14c, . . . , also. A second supporting member 43 is provided integrally with the supporting member 42 for supporting the upper clip 14b at its central engaging projection 30 so that the lowermost clip 14a may fall properly. A plunger 45 is provided in the horizontal plane in which the lowermost clip 14a lies, and is urged by a spring 44 toward the developing station. The plunger 45 is movable in the direction of the arrow B against the force of the spring 44 to move the rod portion 23 of the lowermost clip 14a along the bend 40 to allow the clip 14a to drop to the position b where engagement between the paper 1 and the clip 14 is carried out. The plunger 45 may be so actuated, for example, when the hole 32 has been detected by the sensor 15. The oppositely disposed chains 25 are driven by sprockets 46. The clip guide 33 is provided with arcuate slots 47 extending along the chains 25. A substantially horizontal groove 48 is connected to the vertical groove portion 41 for bringing the chains into engagement with the guide clip 14 which has been lowered to the position b and engaged with the leading edge of the strip 1. The rod portion 23 of the guide clip 14 is engaged by the chain grooves 26 at the junction c between the horizontal grooves 48 and the arcuate slots 47, and is conveyed along the outer edges 47' of the slots.

Figure 6A:
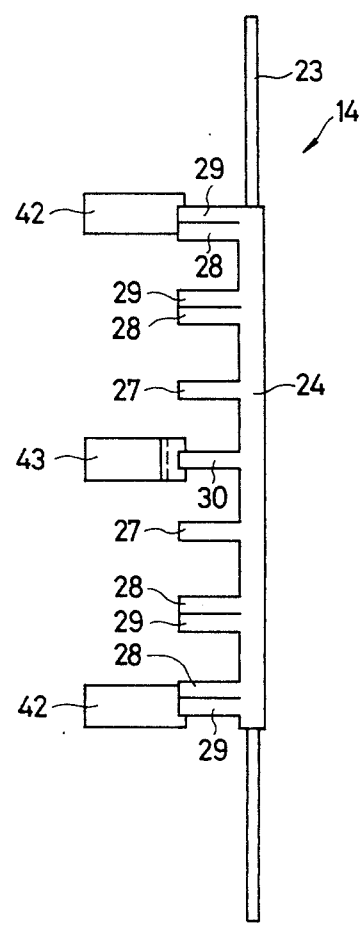
FIGS. 6($a$) and ($b$) are views illustrating the relationship of the guide clip, the supporting member for the lowermost clip, and the second supporting member.
Figure 6B:
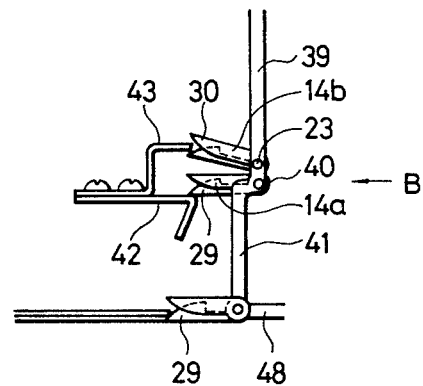

FIGS. 6(a) and 6(b) illustrate the relationship of the guide clip 14, the guide grooves 38, the lower clip supporting members 42 and the second supporting member 43.

The supporting members 42 for the lowermost clip are provided for respectively supporting the downwardly curved projections 29 at both ends of the engaging portion 24 of the lowermost clip 14a. The second supporting member 43 supports thereon the central engaging projection 30 of the clip 14b above the lowermost clip 14a. The plunger 45 (FIG. 5) is actuated to cause the rod portion 23 of the lowermost clip 14a to slide along the horizontal bends 40 of the guide grooves 38. As soon as the rod portion 23 has reached the upper ends of the vertical portions 41, it drops down, while the engaging portion 24 is rotated about the free ends of the supporting members 42 clockwise as viewed in FIG. 6(b). This clockwise rotation is not prevented by the remaining clips 14b, 14c, . . . stacked on the lowermost clip 14a, since a sufficient space for such rotation is provided below the next clip 14b having its central engaging projection 30 supported on the second supporting member 43, so that the lowermost clip 14a may drop to the lower ends of the groove portions 41. As long as the plunger 45 stays in its advanced position as shown by arrow B, the rod portion of the upper clip 14b rests on the plunger 45, and its central engaging projection 30 rests on the second supporting member 43, so that the engaging portion 24 of the lowermost clip 14a may be allowed to rotate properly. Upon retraction of the plunger 45, the rod portion 23 of the upper clip 14b drops by its own weight into the horizontal bends 40, whereupon its central engaging projection 30 is disengaged from the second supporting member 43, and its downwardly curved projections 29 rest on the lower clip supporting members 42 until the plunger 45 is again advanced.

Figure 7:
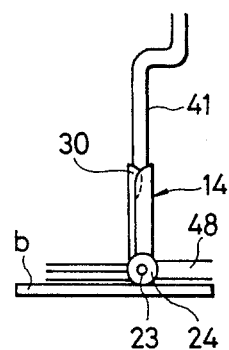
FIG. 7 shows the state in which the locking pawls of the guide clip are inadvertently oriented upwardly.
Figure 8:
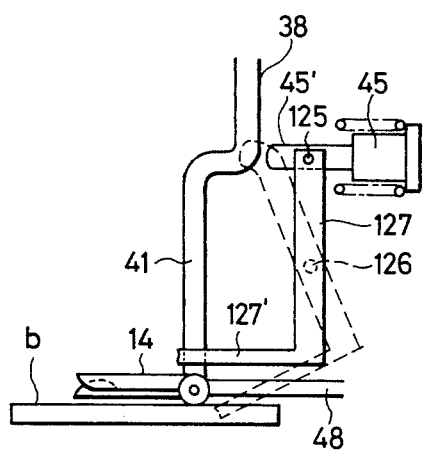
FIG. 8 illustrates a modified embodiment according to this invention which avoids the drawback shown in FIG. 7.

When the guide clip 14 drops from the vertical portion 41 to the standby position b, there is a probability that the guide clip may be set with its locking pawl 30 oriented upwardly, as shown in FIG. 7. This phenomenon is due to the structure of the guide clip 14 and the clearance between the vertical portion 41 and the rod portion 23 of the guide clip 14. This would be more probable if the operation speed of the plunger 45 were increased or if the vertical path of the vertical portion 41 were made long. If the guide clip 14 is set with the locking pawl 30 oriented upwardly, the locking engagement between the locking pawl and the photographic paper web transferred to the standby position b is not possible. Therefore, according to the invention, as shown in FIG. 8, a guide clip position control member 127 is provided. The guide clip position control member 127 is of L-shape and is pivotally secured by a pin 126 at substantially its center portion. The member 127 has a top end pivotally connected to a stem 45' of the plunger 45 by a pin 125. With this arrangement, the member 127 swings about the pin 126 in response to the operation of the stem 45', as shown by a broken line in FIG. 8. The member 127 has a lower end 127' which serves as a control portion for correct orientation of the locking pawl. When the guide clip drops toward the standby position b in response to the extension of the plunger stem, the lower end of the control member 127 does not interrupt the falling of the guide clip 14, as shown by the broken line, since the lower end is positioned apart from the vertical path 41. If the pawl inadvertently extends upwardly upon reaching the standby position b, the lower end 127' of the control member 127 pushes the upwardly oriented locking pawl so that the pawl swings in a counterclockwise direction in FIG. 8, to thus correctly position the guide clip at the standby position. Upon completion of this operation, the horizontal portion of the control member 127 serves as a holding member for the guide clip during the locking engagement between the locking pawl and the photographic paper web, and further, upon completion of such engagement, the horizontal portion serves as a guide for the travel of the guide clip with the web along horizontal groove 48.

According to this invention, the cutter 13, the hole puncher 12 and the clip guide 33 are vertically movable with the printing device including the printing table 7 (as surrounded by solid lines in FIG. 1), so that the distance between the printing table 7 and the light source 11 may be variable. As the developing device 4 is stationary, the chain conveyor device connects the movable device to the stationary device so as to convey the strip 1 to the developing device 4.

Figure 9B:
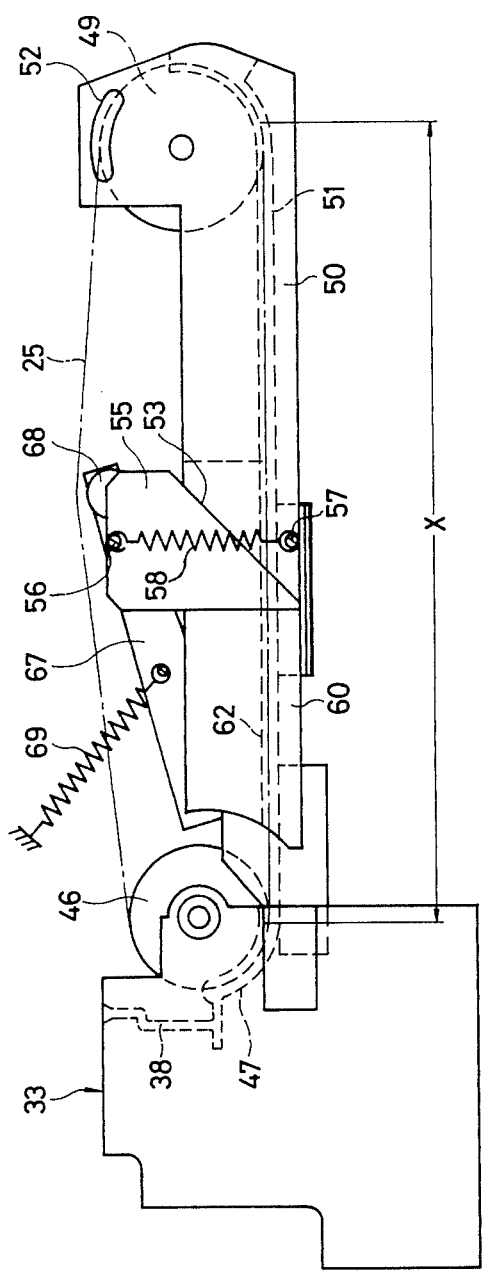
FIGS. 9($a$) and 9($b$) are a top plan view and a side elevational view, respectively, of the chain conveyor device.

FIG. 9(a) is a top plan view of the chain conveyor guide device 3 in the apparatus of this invention, and FIG. 9(b) is a side elevational view thereof. Since the clip guide 33 is vertically movable with the printing device, while the developing device is stationary, the distance X of chain conveyance is variable with the vertical movement of the clip guide 33. A shaft 61 for the sprockets 49 provided adjacent to the entrance of the developing device is always in a fixed position. A pair of protection plates 50 are provided outwardly of the chains 25 and parallel thereto, and are supported rotatably on the developing device 4. Each protection plate 50 has an inner surface formed with a guide groove 51 in which one end of the rod portion 23 of the guide clip 14 slidably rests. The projection plates 50 are inclined with the inclination of the chains 25 as a result of the vertical movement of the clip guide. The angle of inclination of the protection plates is defined by arcuate slots 52. The outer surface of each protection plate 50 has a recess 54, and the edge of the recess 54 which is closer to the developing device defines an inclined guide surface 53. A slide plate 55 is disposed in the recess 54, and is movable vertically along the guide surface 53. A pin 56 projects from the slide plate 55, while the protection plate 50 also has a pin 57. A spring 58 extends between the pins 56 and 57 to urge the slide plate 55 downwardly.

A protection plate 60 which is movable with the vertical movement of the clip guide 33 is provided adjacent each protection plate 50, and has an end facing an end 59 of the protection plate 50, and which is in sliding contact with the slide plate 55. Each protection plate 60 has an inner surface formed with a guide groove 62 which is aligned with the guide groove 51 of the protection plate 50, and in which one end of the rod portion 23 of the guide clip, which is engaged with the chain grooves 26, rests slidably.

Posts 63 and 64 extend from the inner surfaces of the protection plates 60 and 50, respectively, to support strip supporting members 65 and 66. A slide plate 67 has one end supported rotatably on a post 63. A tension control roller 68 is rotatably supported on the other end of the slide plate 67. Each slide plate 67 is loaded by a spring 69 to press the tension control roller 68 against one of the chains 25 to prevent its sagging.

If the printing device is moved vertically to vary the distance between the printing table 7 and the light source 11, to adjust the size of the area to be printed, the clip guide 33 is also moved vertically, and the distance X of chain conveyance is altered. If the slide plates 55 in the recesses 54 are lowered along the end surfaces of the protection plates 60 and the guide surfaces 53 of the protection plates 50, the distance X is increased, while it is decreased if the slide plates 55 are raised. The chains 25 do not sag, however, since they are supported upon the tension control rollers 68. A sensor 70 is provided in the path of chain conveyance for transmitting a signal when the trailing edge of the strip 1 being fed to the developing device 4 has passed thereover.

The operation of the apparatus embodying the invention will now be described.

The strip 1 is unwound from the spool 5, and passed about the tension roller 6 and over the printing table 7 in the direction of the arrow A, and its leading edge is received between the double press roller 8 and the feed roller 9. If the leading edge of the strip 1 has been detected by the sensor 10, it is returned upstream; if not, the strip 1 is moved forward, so that the leading edge of the paper 1 may stay at a prescribed position. Any sag which the strip 1 may form between its leading edge and the spool 5 when it is moved back is absorbed by the displacement of the tension roller 6.

After the leading edge of the strip 1 has been detected by the sensor 10, it is conveyed to and stopped at the position a at the downstream end of the area $L_6$. The hole puncher 12 is actuated to form a hole 32 and a pair of perforations 31 in the strip, with which the printing paper guide clip 14 is engageable, and the cutter 13 cuts the leading edge of the strip 1 at the predetermined distance $L_7$ from the perforations at right angles to the longitudinal edges of the strip 1. The position a is spaced from the cutter 13 by an appropriate distance, which is usually 2 to 5 mm, so that the leading edge of the strip 1 may be cut in a straight line at right angles to the longitudinal edges thereof. It is likely that the leading edge of the strip 1 may not be perpendicular to the longitudinal edges thereof before it is cut.

The strip 1 cut by the cutter 13 is moved back toward the printing table by the returning means, which may comprise the feed roller 9 and the tension roller 6 or the spool 5, until its leading edge reaches a position between the feed roller 9 and one of the press rollers 8. Accordingly, a part of that photographic paper lying between the press rollers 8 and the cutter 13 is moved back toward the printing table without being wasted.

When the spool 5 still carries unprinted photographic paper 1 thereon upon completion of a printing cycle, the invention ensures that the unprinted paper 1 lying between the press rollers 8 and the cutter 13 after the printed portion has been cut off therefrom will be moved back toward the printing station by the returning means. Therefore, the apparatus enables the economical use of a part of the unprinted portion of the strip for another printing cycle.

According to this invention, it is further possible to eliminate the waste of photographic paper 1 by shortening the length of paper existing between the printed portion of the strip 1 and the unprinted portion thereof to be printed during a subsequent printing cycle when the spool 5 still carries unprinted photographic paper 1 thereon. Although the portion of the strip 1 lying between the feed roller 9 and the cutter 13 is moved back to the upstream side of the feed roller 9 by the returning means, the photographic paper 1 lying in the vicinity of the feed roller 9 cannot be printed. It is, however, possible to eliminate the paper portion that cannot be printed, if the portion printed during one printing cycle is cut from the strip 1 after another printing cycle operation is begun. These features will be described in further detail with reference to FIG. 3.

FIG. 3 is a diagrammatical view showing the feed of strip 1 in relation to the printing and cutting operations. A first printing cycle ends with a frame $A_5$ on strip 1. According to the invention, the printed portion ending with frame $A_5$ is not then cut from strip 1 at the area d where the photographic paper guide clip 14 is to be engaged with strip 1, but a second printing operation is started. As the second printing cycle proceeds and the strip 1 moves forward in the direction of the arrow A, the leading edge of the area d reaches the cutter 13, whereupon the hole puncher 12 and the cutter 13 are actuated to cut the strip 1. While the previously printed portion $A_1$–$A_5$ cut from the strip 1 is conveyed through the guide station 3 and the developing station 4, the leading edge of the remaining strip 1 is in a standby position for engagement with the photographic paper guide clip 14, while the second printing cycle is going on for frames $B_1$, $B_2$, . . . . If the length of paper to be printed during the second printing cycle is greater than $L_5+L_4-L_3$, its leading edge is engaged with the photographic paper guide clip 14, and after the photographic paper 1 has been fed forward a predetermined distance, it is stopped.

After the strip 1 has been cut by the cutter 13, it is continuously conveyed by the press rollers 8 and the feed roller 9. If the sensor 15 detects the hole 32, the plunger 45 functions to cause the lowermost guide clip 14a to drop to its standby position b along the horizontal bend 40 and vertical portion of the guide groove 38. The leading edge of the strip 1 is conveyed along the clip guide 16, and engaged with the clip engaging portion 24. The occurrence of such engagement is ascertained by the sensor 34. The sensor 36 ascertains if the guide clip 14 has dropped to its correct standby position b. The sensor 35 checks for the presence of remaining clips in the clip case 22 to enable a fresh supply of clips if required.

If the strip 1 is engaged with the guide clip 14, the clip guide 16 opens as shown by the solid line in FIG. 1. The strip 1 is progressively printed, and fed into the reservoir 17. If a prescribed amount of strip 1 is collected in the reservoir 17, the guide clip 14 is transferred to the chain conveyor device 25 and the developing device 4 to feed the strip 1 thereinto.

The strip 1 is cut by the cutter 13 when the amount of paper 1 in the reservoir 17 has decreased, after progressive transfer into the developing device 4, to the extent such that only the uppermost sensor 19 can detect the loop. The strip 1 is, however, not cut in the event that further printing is desired before the bottom Y of the loop reaches the sensor 19 after gradual reduction in the paper in the reservoir 17. A printing signal may, for example, be transmitted for resuming the printing operation when the bottom Y of the loop has moved past the lowermost sensor 21 in the reservoir 17. The passage of the trailing edge of the strip 1 through the sensor 70 in the chain conveyor device 25 indicates the termination of the supply of photographic paper to the developing device 4.

According to the photographic printing apparatus of this invention, it is possible to continuously supply a strip of printed photographic paper for the developing operation, whether the printing operation still continues in the printing device 2 or has been interrupted, as hereinabove described. It is also possible to obtain improved working efficiency, since a guide clip can be automatically supplied into the path of strip conveyance from a clip case in which a plurality of guide clips 14 can be accommodated. If required, it is possible to provide means for backing the strip to reduce the waste of photographic paper. The apparatus of the invention further ensures the proper transfer of photographic paper by providing an expandable chain conveyor device between the vertically movable arrangement defined by the cutter, hole puncher and clip guide and printing mechanism and the stationary developing device.

What is claimed is:

1. A photographic printing apparatus, comprising: a cutter for cutting a strip of photographic printing paper, a hole puncher for making perforations in said strip adjacent to a leading edge thereof, means for engaging a printing paper guide clip in said perforations, a reservoir for temporarily accommodating a portion of said strip continuing from said guide clip, said reservoir disposed between said cutter and said means for engaging said printing paper guide clip, and means for transferring said guide clip with said leading edge of said strip engaged therewith to a developing apparatus.

2. A photographic printing apparatus as set forth in claim 1, wherein said cutter, said hole puncher and said clip engaging means are jointly vertically movable with a printing station, and wherein said transferring means including an entrance adapted to follow the vertical movement of said printing station, and an exit disposed at a fixed position in the vicinity of an entrance of said developing apparatus.

3. A photographic printing apparatus as set forth in claim 1, said reservoir containing sensors for detecting a length of a paper loop formed therein.

4. A photographic printing apparatus as set forth in claim 1, said printing apparatus operating intermittently and said developing apparatus operating continuously, said reservoir serving to harmonize speeds of the intermittent and continuous processes.

5. A photographic printing apparatus as set forth in claim 2, said transferring means comprising conveying means having a variable conveyance distance, said conveyor having at least one expandable run bridging a distance between said printing and developing apparatuses.

6. A photographic printing apparatus as set forth in claim 5, said conveyor including relatively slidable plates, and means moving between said plates in response to relative movement between said printer and developer.

7. A photographic printing apparatus as set forth in claim 6, said conveyor comprising a chain conveyor having chains engaging ends of said guide clip, both runs of said chain conveyor being of a variable distance, a return run being supported by tension means.

8. A photographic printing apparatus, comprising: a cutter for cutting a strip of photographic printing paper, a hole puncher for making perforations in said strip adjacent to a leading edge thereof, means for engaging a printing paper guide clip in said perforations, a reservoir for temporarily accommodating a portion of said strip continuing from said guide clip, and means for transferring said guide clip with said leading edge of said strip engaged therewith to a developing apparatus, wherein said clip engaging means includes means for feeding said guide clips one by one to a location at which said guide clips are engaged with said strip.

9. A photographic printing apparatus as set forth in claim 8, said clip engaging means including a vertical clip storage area in which a plurality of clips may be stacked, a horizontal transfer area, and a vertically extending delivery path extending to said engagement location.

10. A photographic printing apparatus as set forth in claim 9, said clips being horizontally moved through said transfer area one by one by means of pushing means.

11. A photographic printing apparatus as set forth in claim 10, said clips at said transfer area and immediately thereabove being supported by means engaging said clips at edges thereof.

12. A photographic printing apparatus as set forth in claim 11, said clips rotating while leaving said support means while travelling from said transfer area to said delivery path, and means operating with said pushing means for correctly orienting a clip at said engagement position.

13. A photographic printing apparatus, comprising: a cutter for cutting a strip of photographic printing paper, a hole puncher for making perforations in said strip adjacent to a leading edge thereof, means for engaging a printing paper guide clip in said perforations, a reservoir for temporarily accommodating a portion of said strip continuing from said guide clip, and means for transferring said guide clip with said leading edge of said strip engaged therewith to a developing apparatus, said hole puncher making perforations numbering greater than a number required for engagement with said guide clip, the additional perforation being detected by sensor means, and means advancing a guide clip to an engagement position in response to said detection.

14. A photographic printing apparatus, comprising: a cutter for cutting a strip of photographic printing paper, a hole puncher for making performations in said strip adjacent to a leading edge thereof, means for engaging a printing paper guide clip in said perforations, a reservoir for temporarily accommodating a portion of said strip continuing from said guide clip, means for transferring said guide clip with said leading edge of said stipring engaged therewith to a developing apparatus, and means for returning said strip in a direction opposite said conveyance direction after cutting a portion from said strip, to allow printing to take place on portions of the returned strip.

15. A photographic printing apparatus as set forth in claim 14, and including tension means for maintaining strip tension upon said return of said strip.

16. In a mechanism for conveying a strip of printed photographic paper from a printing device to a developing device, said mechanism including a pair of chains, belts, or like circulating conveying means engageable with both ends of a guide clip connected to the leading edge of said strip, for conveying said guide clip and said strip, the improvement comprising a pair of first plates provided outwardly of said circulating conveying means and parallel thereto, and supported rotatably on said developing device, a pair of second plates provided outwardly of said circulating conveying means and parallel thereto, and supported rotatably on said printing device, a pair of slide plates, each provided between one of said first plates and one of said second plates, for sliding movement in accordance with a variation in the distance between said first and second plates, and means for controlling tension on said circulating conveying means.

17. An apparatus for guiding guide clips for a strip, said mechanism being disposed between first and second means for conveying said strip, said second conveying means being engageable with both ends of a guide clip connected to said strip for conveying said guide clip with said strip, said apparatus comprising a clip case, said case accommodating a plurality of guide clips in mutually stacked relation, clip guide grooves connected to said clip case, means for supporting a guide clip at at least one edge thereof, and means for pushing said guide clip, said pushing means being located on the opposite side of said guide grooves from said supporting means.

18. An apparatus as set forth in claim 17, wherein each of said guide grooves includes a first storage portion, a bend and a delivery portion, said supporting means comprising first means provided adajcent to said bend for supporting a lowermost guide clip, and second means provided above said first supporting means for supporting a further guide clip located immediately above said lowermost guide clip, said pushing means being provided adjacent to said bend for moving said lowermost guide clip along said bends, and allowing said lowermost guide clip to drop along said delivery portions to a location where it is engageable with said strip.

19. An apparatus as set forth in claim 18, further comprising means for controlling the orientation of said guide clip dropped to said location where it is engageable with said strip, said orientation controlling means being pivotally secured to and operated in response to said pushing means.

* * * * *

UNITED STATES PATENT AND TRADEMARK OFFICE
CERTIFICATE OF CORRECTION

PATENT NO. : 4,447,146
DATED : May 8, 1984
INVENTOR(S) : Kogane et al.

It is certified that error appears in the above-identified patent and that said Letters Patent are hereby corrected as shown below:

Please change the Assignees to read --Fuji Photo Film Co., Ltd. , Kanagawa, Japan.--

Signed and Sealed this

Thirteenth Day of November 1984

[SEAL]

Attest:

GERALD J. MOSSINGHOFF

Attesting Officer    Commissioner of Patents and Trademarks